US009684605B2

(12) United States Patent
Shanbhogue et al.

(10) Patent No.: US 9,684,605 B2
(45) Date of Patent: Jun. 20, 2017

(54) TRANSLATION LOOKASIDE BUFFER FOR GUEST PHYSICAL ADDRESSES IN A VIRTUAL MACHINE

(71) Applicant: Intel Corporation, Santa Clara, CA (US)

(72) Inventors: Vedvyas Shanbhogue, Austin, TX (US); Christopher Bryant, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/628,405

(22) Filed: Feb. 23, 2015

(65) Prior Publication Data
US 2016/0246732 A1    Aug. 25, 2016

(51) Int. Cl.
G06F 12/10        (2016.01)
*G06F 12/1036*    (2016.01)
*G06F 12/1009*    (2016.01)

(52) U.S. Cl.
CPC ...... *G06F 12/1036* (2013.01); *G06F 12/1009* (2013.01); *G06F 2212/68* (2013.01)

(58) Field of Classification Search
CPC .............. G06F 12/1036; G06F 3/0604; G06F 12/1009; G06F 3/0664; G06F 3/0683; G06F 3/0653; G06F 2212/68
See application file for complete search history.

(56) References Cited

U.S. PATENT DOCUMENTS 7,516,453 B1 *   4/2009 Bugnion ............. G06F 9/45504
                                                           712/227
2009/0187904 A1 * 7/2009 Serebrin ................. G06F 9/455
                                                           718/1
(Continued)

*Primary Examiner* — John A Lane
(74) *Attorney, Agent, or Firm* — Nicholson De Vos Webster & Elliott, LLP

(57) ABSTRACT

Embodiments of an invention for a guest-physical address translation lookaside buffer are disclosed. In an embodiment, a processor includes an instruction decoder, a control register, and memory address translation hardware. The instruction decoder is to receive an instruction to transfer control of the processor to guest software to execute on a virtual machine. The virtual machine is to have a plurality of resources to be controlled by a virtual machine monitor. The virtual machine monitor is to execute on a host machine having a host-physical memory to be accessed using a plurality of host-physical addresses. The plurality of resources is to include a guest-physical memory. The guest software is to access the guest-physical memory using a plurality of guest-virtual addresses. The control register is to store a pointer to a plurality of virtual address page tables. The memory address translation hardware is to translate, without causing a virtual machine exit, guest-virtual addresses to host-physical addresses using the plurality of virtual address page tables and a plurality of extended page tables. The memory address translation hardware includes a virtual address translation lookaside buffer in which to store a plurality of virtual address entries corresponding to guest-virtual address to host-physical address translations. The memory address translation hardware also includes a guest-physical address translation lookaside buffer in which to store a plurality of guest-physical address entries corresponding to guest-physical address to host-physical address translations.

16 Claims, 9 Drawing Sheets

(56) References Cited

U.S. PATENT DOCUMENTS

| | | | |
|---|---|---|---|
| 2011/0010713 A1* | 1/2011 | Matsumoto | G06F 9/4881 718/1 |
| 2013/0276057 A1* | 10/2013 | Smith | G06F 21/00 726/1 |
| 2014/0006734 A1* | 1/2014 | Li | G06F 9/45558 711/162 |
| 2014/0380009 A1* | 12/2014 | Lemay | G06F 12/145 711/163 |
| 2015/0121366 A1* | 4/2015 | Neiger | G06F 9/4555 718/1 |
| 2015/0134829 A1* | 5/2015 | Kruglick | G06F 3/0608 709/226 |
| 2016/0048464 A1* | 2/2016 | Nakajima | G06F 12/1475 711/152 |
| 2016/0188354 A1* | 6/2016 | Goldsmith | G06F 9/45558 718/1 |

* cited by examiner

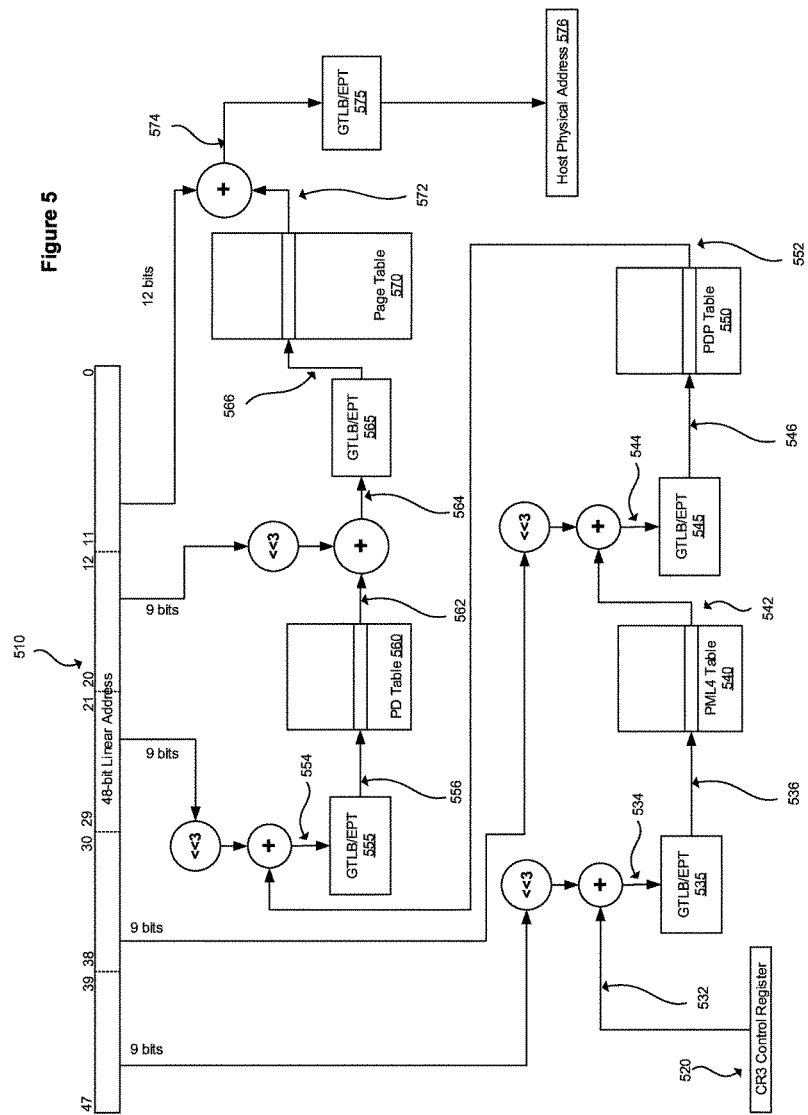

TRANSLATION LOOKASIDE BUFFER FOR GUEST PHYSICAL ADDRESSES IN A VIRTUAL MACHINE

BACKGROUND

Virtualization enables a single host machine with hardware and software support for virtualization to present multiple abstractions of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which controls the host machine. The VMM provides guest software operating in a virtual machine with a set of resources (e.g., processors, memory, input/output devices). The VMM may map some or all of the components of a physical host machine into the virtual machine, and may create fully virtual components, emulated in software in the VMM, to also include in the virtual machine (e.g., virtual input/output devices). The VMM may thus be said to provide a "virtual bare machine" interface to guest software. The VMM uses facilities in a hardware virtualization architecture to provide services to a virtual machine and to provide protection from and between multiple virtual machines executing on the host machine.

As guest software executes in a virtual machine, certain instructions executed by the guest software (e.g., instructions accessing input/output devices) would normally directly access hardware if the guest software were executing directly on a hardware platform. In a virtualization system supported by a VMM, these instructions may cause a transition to the VMM, referred to herein as a virtual machine exit. The VMM handles these instructions in software in a manner suitable for the host machine hardware and host machine resources consistent with the virtual machines on which the guest software is executing. Similarly, certain interrupts and exceptions generated in the host machine may need to be intercepted and managed by the VMM or adapted for the guest software by the VMM before being passed on to the guest software for servicing. The VMM then transitions control to the guest software and the virtual machine resumes operation. The transition from the VMM to guest software is referred to herein as a virtual machine entry.

As is well known, a process executing on a machine on most operating systems may use a virtual address space, which is an abstraction of the underlying physical memory system. As is known in the art, the term virtual when used in the context of memory management (e.g., "virtual address," "virtual address space," "virtual memory address," or "virtual memory space") refers to the well known technique of a processor based system, generally in conjunction with an operating system, presenting an abstraction of underlying physical memory to a process executing on a processor-based system. For example, a process may access a virtual, contiguous, linearized address space abstraction which is mapped to non-linear and non-contiguous physical memory by the underlying operating system. This use of virtual is distinguishable from the use of the same term used in the context virtualization, where virtual generally refers to an abstraction that simulates a physical machine (e.g., "virtual machine," "virtual bare machine," "virtual hardware," "virtual processor," or "virtual network interface"). The intended meaning of the term will be clear to one in the art based on the context in which it is used herein.

FIG. 1 shows a process executing on a processor-based system which incorporates a processor 120 and a memory 145 communicatively coupled to the processor by a bus 150. With reference to FIG. 1, when a process 105 references a memory location 110 in its virtual address space 115 (process virtual memory space), a reference to an actual address 140 in the physical memory 145 of the machine 125 (machine physical memory) is generated by memory management 130, which may be implemented in hardware (sometimes incorporated into the processor 120) and/or software (generally in the operating system of the machine). Memory management 130, among other functions, maps a location in the virtual address space to a location in physical memory of the machine. As shown in FIG. 1, a process may have a view of memory that is different from the actual memory available in the physical machine. In the example depicted in FIG. 1, the process operates in a virtual address space from 0 to 1 MB which is mapped by the memory management hardware and software into a portion of the physical memory (an address space from 10 to 11 MB) to compute a physical address from a process space address; for example, by adding an offset 135 to the process virtual address. More complex mappings from process virtual memory space to physical memory are possible, for example, the physical memory corresponding to process virtual memory may be divided into parts such as pages and be interleaved with pages from other processes in physical memory.

Memory is customarily divided into pages, each page containing a known amount of data, varying across implementations; e.g. a page may contain 4096 bytes of memory. As memory locations are referenced by the executing process, they are translated into page references. In a typical machine, memory management maps a reference to a page in process virtual memory to a page in machine physical memory. In general, memory management may use a page table to specify the physical page location corresponding to a process space page location.

One aspect of managing guest software in a virtual machine environment is the management of memory. Handling memory management actions taken by guest software executing in a virtual machine creates complexity for controlling system software such as a virtual machine monitor. Consider, for example, a system in which two virtual machines execute via virtualization on a host machine implemented on an Intel® 64 Architecture platform (IA), which is described in the *Intel® 64 and IA-32 Architectures Software Developer's Manual* (IA documentation). The IA platform may include IA page tables implemented as part of an IA processor. Further, assume that each virtual machine itself presents an abstraction of an IA machine to the guest software executing thereon. Guest software executing on each virtual machine may make references to a guest process virtual memory address, which in turn is translated by the guest machine's memory management system to a guest-physical memory address. However, guest-physical memory itself may be implemented by a further mapping in host-physical memory through a VMM and virtualization hardware on the host processor. Thus, references to guest memory by guest processes or a guest operating system, including, for example, references to guest IA page table control registers, are intercepted by the VMM because they cannot be directly passed on to the host machine's IA page tables without further reprocessing, as the guest-physical memory does not, in fact, correspond directly to host-physical memory, but is rather further remapped through the virtualization system of the host machine.

BRIEF DESCRIPTION OF THE DRAWINGS

FIG. 5 depicts address computation using a guest physical address translation lookaside buffer and/or extended paging tables in one embodiment.

DETAILED DESCRIPTION

Embodiments of an invention for a guest physical address translation lookaside buffer are described below. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

Figure 1:
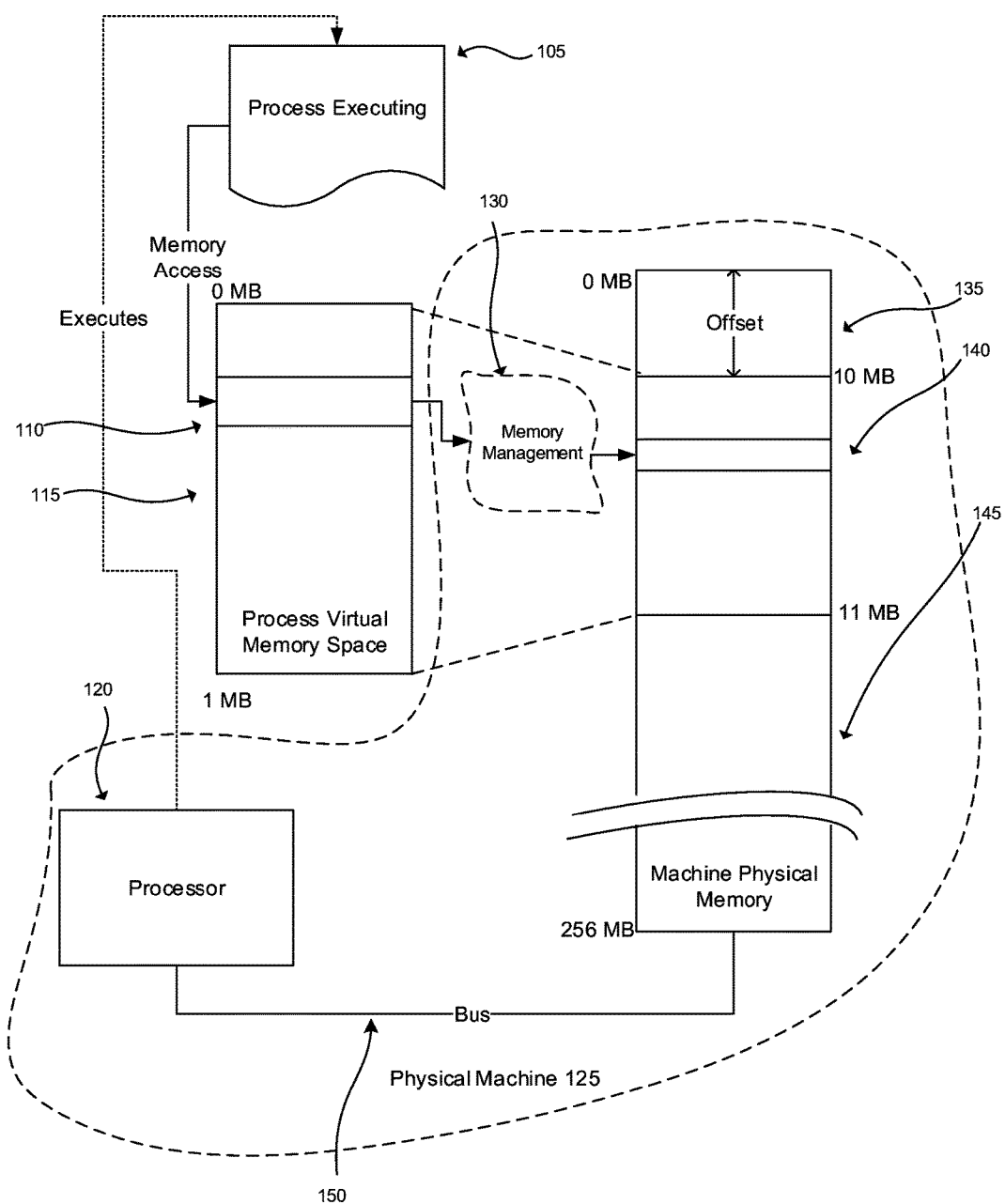
FIG. 1 depicts a relationship between process and physical memory (Prior Art).
Figure 2:
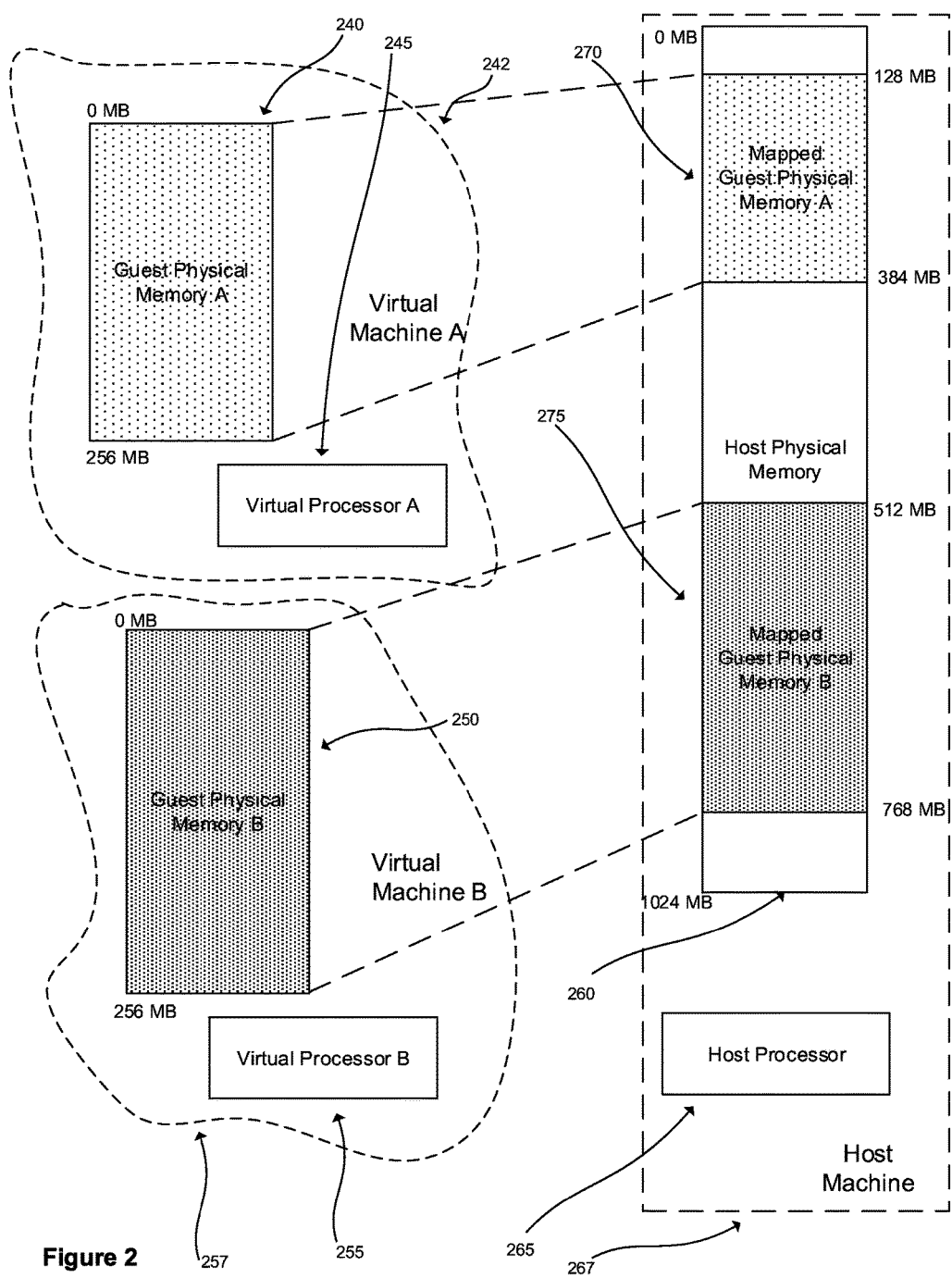
FIG. 2 depicts abstractly the relationship between virtual machines and a host machine in one embodiment.

FIG. 2:

FIG. 2 depicts the relationship between one or more virtual machines executing on a host machine with specific regard to the mapping of guest memory in one embodiment. FIG. 2 illustrates how guest-physical memory is remapped through the virtualization system of the host machine. Each virtual machine, such as virtual machine A, 242, and virtual machine B, 257, presents a virtual processor, such as virtual processor 245 and virtual processor 255, respectively, to guest software running on the virtual machine. Each machine provides an abstraction of physical memory to the guest operating system or other guest software, such as guest-physical memories 240 and 250, respectively. As guest software executes on the virtual machines 242 and 257, it is actually executed by the host machine 267 on host processor 265 utilizing host-physical memory 260.

As shown in FIG. 2, in this embodiment, guest-physical memory 240, which is presented as a physical memory space starting at address 0 in virtual machine A, 242, is mapped to some contiguous region 270 in host-physical memory 260. Similarly, guest-physical memory 250 in virtual machine B, 257, is mapped to a different portion 275 of host-physical memory 260. As shown in FIG. 2, the host machine might have 1024 MB of host-physical memory. If each virtual machine 242 and 257 is assigned 256 MB of memory, one possible mapping might be that virtual machine A, 242, is assigned the range 128-384 MB and virtual machine B, 257, is assigned the range 512-768 MB. Both virtual machines 242 and 257 reference a guest-physical address space of 0-256 MB. Only the VMM is aware that each virtual machine's address space maps to different portions of the host-physical address space.

The virtual machines and memory mapping shown in FIG. 2 are only one representation of one embodiment, in other embodiments, the actual number of virtual machines executing on a host machine may vary from one to many, and the actual memory sizes of the host machine and the virtual machines may vary and be variable from virtual machine to virtual machine. The example depicts a simple, contiguous allocation of memory to virtual machines. In a more general case, the physical-memory pages allocated to a virtual machine may not be contiguous and might be distributed in the host-physical memory interleaved with each other and with pages belonging to the VMM and to other host processes.

A processor-based system that is presented as a virtual machine in a system such as that depicted in FIG. 2 may implement a virtual machine in all its complexity. Thus, for example, a virtual machine may present a full view of guest-physical memory to the guest OS, and perform memory management for guest software executing on the virtual machine, using memory management provided by the guest OS and the virtual processor or other virtual hardware of the virtual machine. In one embodiment, the virtual machine may present an IA platform including IA hardware support such as page tables for memory management to the guest OS, and in turn may actually be executing on a host platform which is also an IA platform including IA hardware for memory management. Without additional mechanisms, a virtualization system in this embodiment implements a physical-memory virtualization algorithm in the VMM using, as one possible solution, IA page table shadowing to remap, partition, and protect physical memory. Thus, for example, when guest software attempts to access the IA page tables of the virtual machine, the VMM overlays functionality required for virtualization (e.g., remapping physical addresses) onto the functionality required by the guest OS.

To this end, the VMM traps a variety of events surrounding the use of the paging mechanism by the guest software. This includes writes to control registers such as control registers of the IA memory management system (e.g., CR0, CR3, and CR4), accesses to model-specific registers (MSRs) associated with paging and memory access (e.g., memory-type range registers (MTRRs)), and handling certain exceptions (e.g., page faults), as described in the IA documentation. This use of the IA page tables to virtualize physical memory is complex and exacts a significant performance overhead.

Figure 3:
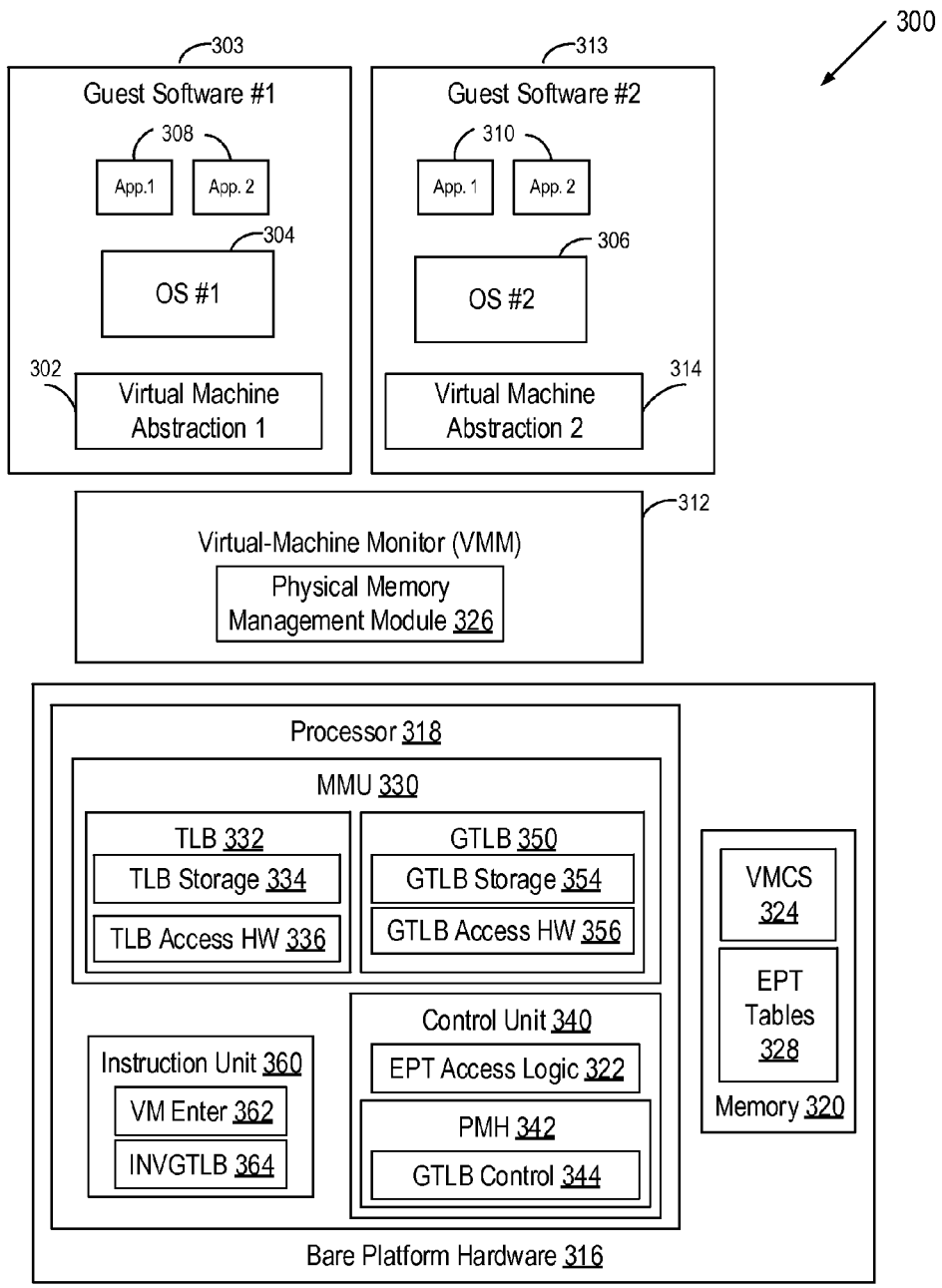
FIG. 3 depicts a high level structure of a virtual machine environment in one embodiment.

FIG. 3:

FIG. 3 illustrates one embodiment of a virtual-machine environment 300. In this embodiment, a processor-based platform 316 may execute a VMM 312. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 312 may be run within, or using the services of, another VMM. VMMs may be implemented, for example, in hardware, software, firmware, or by a combination of various techniques in some embodiments.

The platform hardware 316 may be a personal computer (PC), mainframe, handheld device such as a personal digital assistant (PDA) or "smart" mobile phone, portable computer, set top box, or another processor-based system. The platform hardware 316 includes at least a processor 318 and memory 320. Processor 318 may be any type of processor capable of executing programs, such as a microprocessor, digital signal processor, microcontroller, or the like. The processor may include microcode, programmable logic, and/or hard coded logic for execution in embodiments. Although FIG. 3 shows only one such processor 318, there may be one or more processors in the system in an embodiment. Additionally, processor 318 may include multiple cores, support for multiple threads, or the like. Memory 320 may comprise random access memory (RAM), read only memory (ROM), flash or other nonvolatile memory, any combination of the above devices, or any other type of medium readable by processor 318 in various embodiments. Memory 320 may store instructions and/or data for performing program execution and other method embodiments.

The VMM 312 presents to guest software an abstraction of one or more virtual machines, which may provide the same or different abstractions to the various guests. FIG. 3 shows two virtual machines, 302 and 314. Guest software such as guest software 303 and 313 running on each virtual machine (VM) may include a guest OS such as a guest OS 304 or 306 and various guest software applications 308 and 310. Guest software 303 and 313 may access physical resources (e.g., processor registers, memory, and input/output devices) within the virtual machines on which the guest software 303 and 313 is running and to perform other functions. For example, the guest software 303 and 313 expects to have access to all registers, caches, structures, input/output devices, memory, and the like, according to the architecture of the processor and platform presented in the virtual machine 302 and 314.

In one embodiment, the processor 318 controls the operation of the virtual machines 302 and 314 in accordance with data stored in a virtual machine control structure (VMCS) 324. The VMCS 324 is a structure that may contain state of guest software 303 and 313, state of the VMM 312, execution control information indicating how the VMM 312 wishes to control operation of guest software 303 and 313, information controlling transitions between the VMM 312 and a virtual machine, etc. The processor 318 reads information from the VMCS 324 to determine the execution environment of the virtual machine and to constrain its behavior. In one embodiment, the VMCS 324 is stored in memory 320. In some embodiments, multiple VMCS structures are used to support multiple virtual machines.

The VMM 312 may need to manage the physical memory accessible by guest software running in the virtual machines 302 and 314. To support physical memory management in one embodiment, the processor 318 provides an extended page table (EPT) mechanism. In the embodiment, the VMM 312 may include a physical memory management module 326 that provides values for fields associated with physical memory virtualization that may need to be provided before transition of control to the virtual machine 302 or 314. These fields are collectively referred to as EPT controls. EPT controls may include, for example, an EPT enable indicator specifying whether the EPT mechanism should be enabled and one or more EPT table configuration controls indicating the form and semantics of the physical memory virtualization mechanism. These will be discussed in detail below. Additionally, in one embodiment, EPT tables 328 indicate the physical address translation and protection semantics which the VMM 312 may place on guest software 303 and 313.

In one embodiment, the EPT controls are stored in the VMCS 324. Alternatively, the EPT controls may reside in a processor 318, a combination of the memory 320 and the processor 318, or in any other storage location or locations. In one embodiment, separate EPT controls are maintained for each of the virtual machines 302 and 314. Alternatively, the same EPT controls are maintained for both virtual machines and are updated by the VMM 312 before each virtual machine entry.

In one embodiment, the EPT tables 328 are stored in memory 320. Alternatively, the EPT tables 328 may reside in the processor 318, a combination of the memory 320 and the processor 318, or in any other storage location or locations. In one embodiment, separate EPT tables 328 are maintained for each of the virtual machines 302 and 314. Alternatively, the same EPT tables 328 are maintained for both virtual machines 302 and 314 and are updated by the VMM 312 before each virtual machine entry.

In one embodiment, processor 318 includes instruction unit 360, memory management unit (MMU) 330, and control unit 340. Instruction unit 360 may include any circuitry, structures, and/or other hardware, such as an instruction decoder, to fetch, receive, decode, interpret, schedule, and/or otherwise handle instructions to be executed by processor 318. Processor 318 may operate according to an instruction set architecture that includes any number of instructions to support virtualization. Embodiments of the present invention may be practiced with a processor having an instruction set architecture of a processor family from Intel® Corporation, using instructions that may be part of a set of virtualization extensions to any existing instruction set architecture, or according to another approach. Support for these instructions may be implemented in processor 318 using any combination of circuitry and/or logic embedded in hardware, microcode, firmware, and/or other structures. As further described below, processor 318 may support one or more virtual machine entry instructions. Support for these instructions is represented as VM enter block 362.

MMU 330 may include circuitry, structure, and/or other hardware to manage memory 320 and the memory space of processor 318, including translating addresses according to embodiments of the present invention. Control unit 340 may include hardware, firmware, and/or microcode to control the operation of processor 318, including causing processor 318 to perform and/or participate in method embodiments and/or portions of method embodiments of the present invention.

In one embodiment, MMU 330 may include translation lookaside buffer (TLB) 332 and guest physical address translation lookaside buffer (GPA TLB or GTLB 350). TLB 332 may include a buffer, cache memory, or any other type of storage 334 readable and writable by hardware in processor 318 to store translations of linear addresses to host-physical addresses and related information as is known to those skilled in the art and as further described below. TLB 332 may also include access circuitry 336 to access its storage. GTLB 350 may include a buffer, cache memory, or any other type of storage 354 readable and writable by hardware in processor 318 store translations of guest-physical addresses to host-physical addresses, along with associated information, according to embodiments of the present invention and as further described below. GTLB 350 may also include access circuitry 356 to access its storage. In an embodiment, GTLB 332 may represent a fully associative cache having eight entries.

In one embodiment, control unit 330 may include EPT access logic 322. EPT access logic 322 is responsible for determining whether the EPT mechanism is enabled based on the EPT enable indicator. If the EPT mechanism is enabled, the processor translates guest-physical addresses to host-physical addresses based on the EPT controls, GTLB 350, and/or EPT tables 328.

GTLB 350 may be controlled by GTLB control logic 344, implemented in hardware, firmware, and/or microcode, to cause GTLB 350 to access its storage as described below and/or according to other embodiments of the present invention. In one embodiment, GTLB control logic 344 may be included in and/or used by a page miss handler (PMH) 342. PMH 342 may operate in response to what is known in the art as a miss to TLB 332.

In one embodiment, in which the system 300 includes multiple processors or multi-threaded processors, each of the logical processors may be associated with a separate EPT access logic 322, and the VMM 312 may configure EPT tables 328 and EPT controls for each of the logical processors. Furthermore, any number of GTLBs may be included in processor 318 for use by any number of cores and/or logical processors, according to any arrangement.

Resources that may be accessed by guest software (e.g., 303, including guest OS 304 and applications 308) may either be classified as "privileged" or "non-privileged." For privileged resources, the VMM 312 facilitates functionality desired by guest software while retaining ultimate control over these privileged resources. Further, each guest software 303 and 313 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 312 to ensure proper operation of virtual machines 302 and 314 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

Figure 4A:
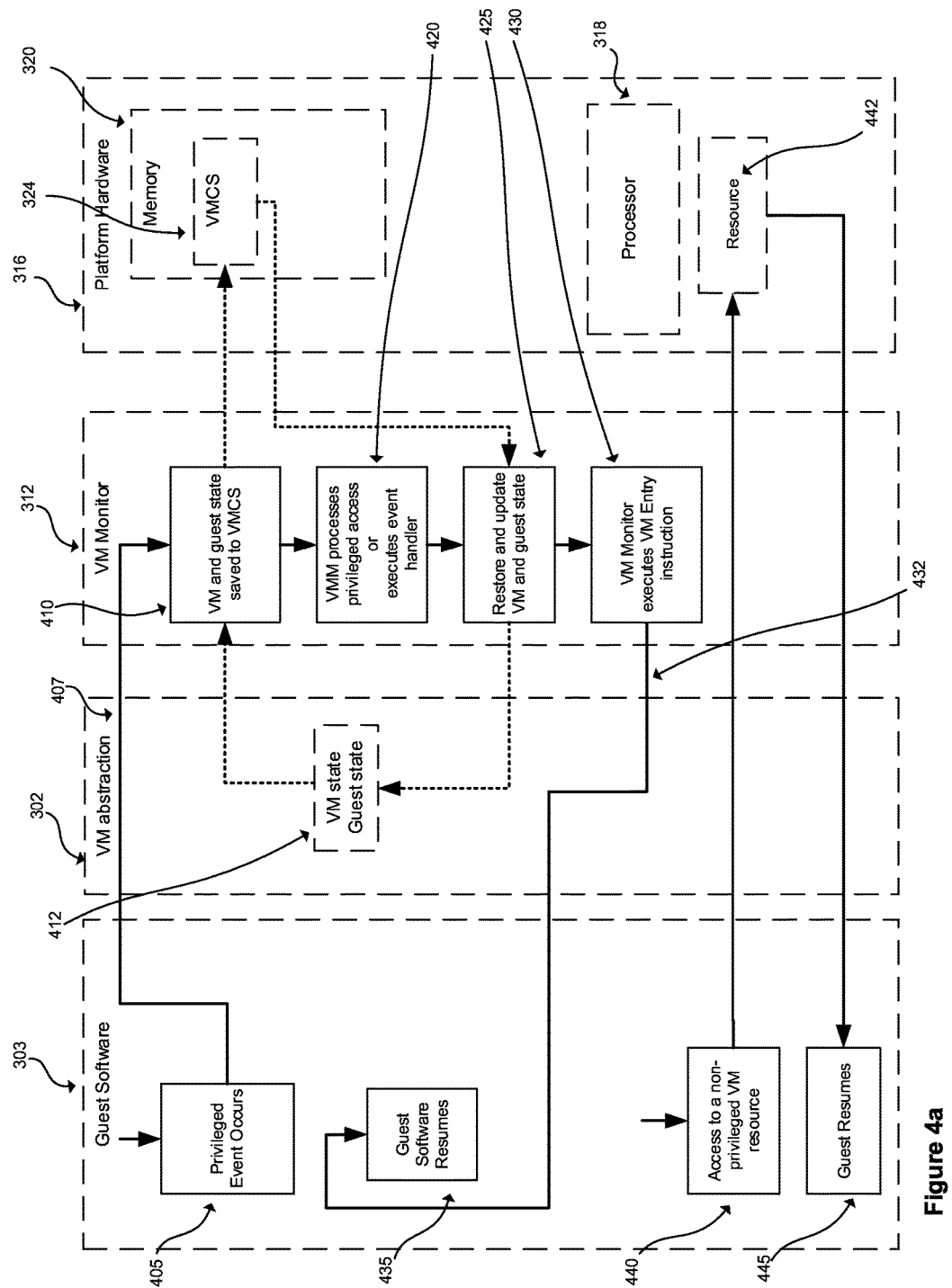
FIGS. 4a and 4b illustrate processing in one embodiment of a virtual machine environment.
Figure 4B:
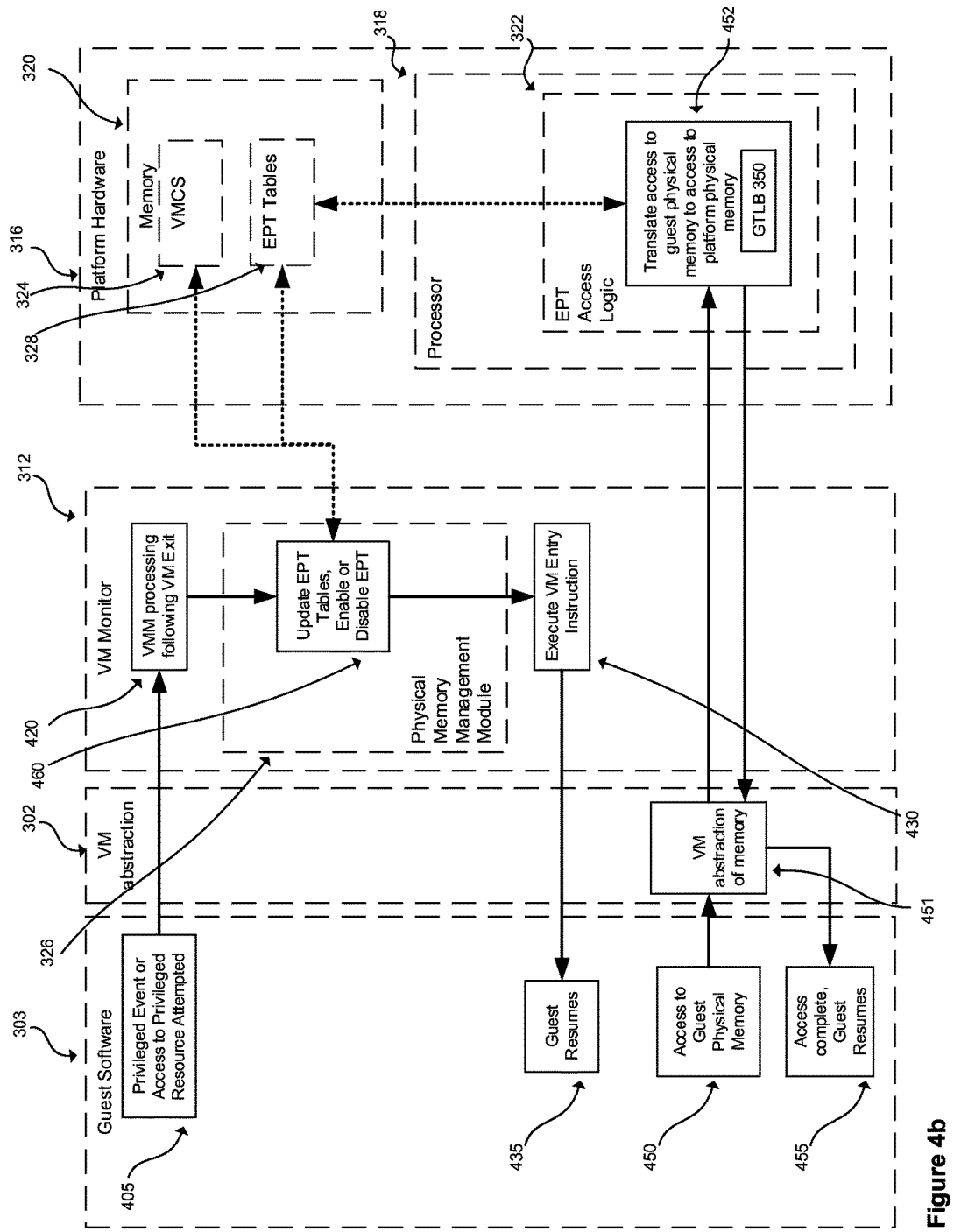

FIGS. 4a and 4b:

Operation of a virtual machine environment in an embodiment such as that previously described and depicted in FIG. 3 is depicted by processing shown in FIGS. 4a and 4b. FIG. 4a depicts the operation of a VM environment in an embodiment to process a privileged event occurring in guest software and the operation of the embodiment to process a non-privileged event by guest software. FIG. 4b depicts operations of a VM environment in an embodiment specifically related to extended paging tables, to guest software access to guest-physical memory, and to the management of the EPT mechanism by the VMM in the embodiment. FIGS. 4a and 4b do not depict all components or all operations that may occur in an environment such as that depicted in FIG. 3. This is solely for clarity of presentation. While a small set of components and a few specific operations are represented in FIGS. 4a and 4b, a VM environment in an embodiment may comprise many other components, and many other operations may take place in such an embodiment.

FIG. 4a is considered first. FIG. 4a depicts an embodiment of one set of operations of guest software 303 executing on a virtual machine abstraction 302 and platform hardware 316 previously described in FIG. 3. The operations are depicted within blocks indicating where in the system (e.g. in the VMM 312, in the guest software 303, etc.) they occur. In addition to other components of the VM environment previously described, VM abstraction 302 may store a virtual machine state and other state information for the guest software 303 at 412 and may also provide other resources such as a virtual network connection or set of general registers, to name two of many examples, to guests. Of course, the physical resources that implement VM state, guest state, and other VM resources are actually provided by the platform hardware 316 on which the VM executes. The platform hardware includes memory 320, in which to store VMCS 324, and processor 318.

At 440, guest software 303 accesses a non-privileged resource 442. Non-privileged resources do not need to be controlled by the VMM 312 and can be accessed directly by guest software which continues without invoking the VMM 312, allowing the guest to continue operation at 445 after accessing the non-privileged resource 442. A non-privileged platform event would likewise be handled without the intervention of the VMM 312 (this is not shown in FIG. 4a).

At 405, the guest software 303 attempts to access a privileged resource, and/or experiences a privileged platform event. When such a privileged event occurs as at 405, control may be transferred 407 to the VMM 312. The transfer of control 407 from guest software to the VMM 312 is referred to herein as a virtual machine exit. After facilitating the resource access or otherwise handling the privileged event appropriately, the VMM 312 may return control to guest software, as at 432, which then resumes operation, 435. The transfer of control 432 from the VMM 312 to guest software is referred to as a virtual machine entry. In one embodiment, the VMM 312 initiates a virtual machine entry by executing an instruction specially designed to trigger the transition, 430, referred to herein as a virtual machine entry instruction.

In one embodiment, when a virtual machine exit occurs, components of the processor state used by guest software are saved, 410, components of the processor state required by the VMM 312 are loaded, and the execution resumes in the VMM 312 at 420. In one embodiment, the components of the processor state used by guest software are stored in a guest-state area of VMCS 324 and the components of the processor state required by the VMM 312 are stored in a monitor-state area of VMCS 324. In one embodiment, when a transition from the VMM 312 to guest software occurs, components of the processor state that were saved at the virtual machine exit (and may have been modified by the VMM 312 while processing the virtual machine exit) are restored 425 and control is returned to the virtual machine 302 at 430.

Next, FIG. 4b is considered. As noted previously, FIG. 4b depicts those operations of the VM environment described above and depicted in FIG. 4a specifically related to extended paging tables, to guest program access to guest-physical memory, and to the management of the EPT mechanism by the VMM in one embodiment. As before, for clarity of presentation, FIG. 4b does not depict all components or all operations that may occur in a VM environment in an embodiment. While a small set of components and a few specific operations are represented in FIG. 4b, a VM environment in an embodiment may comprise many other components, and many other operations may take place in such an embodiment.

The components of the VM environment in the embodiment depicted in FIG. 4b are the guest software 303, VM 302, VMM 312 with a physical memory management module 326, and platform hardware or physical machine 316. The platform hardware further comprises memory 320, including, in this embodiment, a set of EPT tables 328 and a VMCS 324, and a processor 318 with EPT access logic 322 and GTLB 350. In general, a use of the EPT facilities in platform hardware may be initiated by guest software, as shown in FIG. 4b at 450, when an access to guest-physical memory is made, for instance by the guest software 303. Guest-physical memory accesses are referred to the VM abstraction of memory 451 provided by VM 302, which in turn is referred to the physical machine 316. If the EPT mechanism is enabled, the platform hardware 316 may process the VM reference to guest-physical memory using the EPT access logic 322, the GTLB 350, and/or the EPT tables 328 to translate an access to guest-physical memory to an access to host-physical memory 320 in 452, allowing the guest to complete the memory access at 445, without causing a VM exit. Details of EPT operation are discussed with reference to FIGS. 5 and 6 below.

The EPT mechanism itself may be configured by the VMM 312 which configures the EPT tables 328 and the EPT controls, which may be stored in the VMCS 324. In this embodiment, the configuration of the EPT mechanism may be done by the VMM 312 as part of the operation of the physical memory management module 326 following the processing of a privileged event 405 in the VMM 312 and prior to VM entry 430. In configuring the EPT mechanism, the VMM 312 may update the EPT tables 328 and EPT controls, in order to enable, disable, or otherwise control the EPT mechanism, 460.

In an embodiment, VMM 312 may create and/or maintain multiple sets of EPT tables 328, e.g., one set per VM. In such an embodiment, a single GTLB, e.g., GTLB 350, may be used to support more than one VM. Referring again to the embodiment of FIG. 3, VMM 312 may maintain a first set of EPT tables 328 for VM 302 and a second set of EPT tables 328 for VM 314.

Embodiments of the present invention may include a variety of techniques for managing multiple sets of EPTs and the sharing of a GTLB in connection with a change of control between two VMs (a VM switch), whether directly (e.g., from VM 302 to VM 314) or indirectly (e.g., a change of control from VM 302 to VMM 312 followed by a change of control from VMM 312 to VM 314). In an embodiment, the contents of a GTLB may be flushed or invalidated (e.g., global, group, or individual access permission bits and/or a valid bit corresponding to each entry in the GTLB may be cleared). This action may be performed automatically by hardware, firmware, or microcode (e.g., control unit 340) in connection with a VM switch, or it may be performed by software (e.g., VMM 312).

In an embodiment, entries in a GTLB may include or have associated with them a field in which to store an identifier or other value to indicate that an entry is valid for or otherwise associated with one or more particular VMs or set of EPTs. In an embodiment, EPT pointer (as described below) values or a portion thereof may be used as such identifiers in a GTLB. Embodiments in which EPTPs (or other such VM or EPT identifiers) may be stored in, be used to tag, or otherwise be associated with GTLB entries may be used according to a variety of approaches. In a first example, such a tag may be checked to determine whether a GTLB entry is valid for the active set of EPTs (e.g., the GTLB entry corresponds to an address translation that is based on the set of EPTs in use at the time of processing a particular translation). Only the subset of GTLB entries for which a match exists between a GTLB entry's tag and the active EPTP will be used as possible GTLB hits. Therefore, tagged GTLB entries may remain in the GTLB (i.e., not be flushed or invalidated) in connection with a VM or EPT switch because they will only be used for the VM or EPT for which they are valid.

In an embodiment, the instruction set of processor 318 may include one or more instructions providing for software (e.g., VMM 312) to invalidate individual, all, or groups of entries in a GTLB (e.g., GTLB 350). For convenience, such instructions may be referred to as INVGTLB instructions. Support for one or more INVGTLB instructions is represented in processor 318 as INVGTLB block 364.

INVGTLB instructions may be used according to a variety of approaches. In a first example, one or more INVGTLB instructions may be used to invalidate all entries in a GTLB in connection with a VM switch. In a second example, one or more INVGTLB instructions may be used to invalidate one or more entries in a GTLB (e.g., for use in connection with a modification of a corresponding set of EPTs), such that the EPT set and the GTLB become or remain synchronized with each other (i.e., do not contain conflicting information). Many other uses of INVGTLB instructions are possible within the scope of the present invention.

Of course, many other forms of processing are possible for the use of extended paging tables in conjunction with a VM environment, for example, different locations for the EPT controls and EPT tables 328 as discussed earlier with reference to FIG. 3, multiple VMs, multiple processors, multiple threads, multiple guests, and combinations of these variations, among many others.

FIG. 5:

FIG. 5 shows one example of processing using the extended page tables introduced above to ultimately compute a host-physical address when guest software in a virtual machine references a guest virtual address in an embodiment. The example depicted shows guest software running in an IA platform using IA-32e paging. One skilled in the art will easily be able to extend this example to understand, for example, other paging modes, other instruction set architectures, or other configurations.

In FIG. 5 a reference to a guest virtual address 510 is executed by guest software executing in a virtual machine. The memory management mechanism active in the guest (i.e., configured by the guest operating system) is used to translate the virtual address to a guest-physical address. Each guest-physical address used in the translation, as well as the resulting guest-physical address, is translated to host-physical addresses through a GTLB and/or EPTs before accessing the host-physical memory. This process is detailed in the following discussion.

In this example, the appropriate bits 532 in the CR3 register 520 point to the base of the guest's page map level four (PML4) table 540 in guest-physical memory. This guest-physical address 532 is combined with the upper nine bits from the guest virtual address 510 (appropriately adjusted, according to IA semantics by multiplying by eight because, in this example, the entries in the tables are eight bytes each) to form the guest-physical address 534 of the PML4 entry (PML4E) in the guest's PML4 table 540. This guest-physical address 534 is translated (as described below with regard to FIG. 6) through the GTLB/EPTs 535 to form the host-physical address 536 of the guest's PML4 entry. The processor accesses the PML4 entry using this host-physical address 536.

Information from the PML4E includes the base address 542 of the guest's page directory pointer (PDP) table 550 in guest-physical memory. This guest-physical address 542 is combined with bits 38:30 of the guest virtual address 510 appropriately adjusted to form the guest-physical address 544 of the PDP entry (PDPE) in the guest's PDP table 550. This guest-physical address 544 is translated (as described below with regard to FIG. 6) through the GTLB/EPTs 545 to form the host-physical address 546 of the guest's PDP entry. The processor accesses the PDP entry using this host-physical address 546.

Information from the PDPE includes the base address 552 of the guest's page directory (PD) table 560 in guest-physical memory. This guest-physical address 552 is combined with bits 29:21 of the guest virtual address 510 appropriately adjusted to form the guest-physical address 554 of the PD entry (PDE) in the guest's PD table 560. This guest-physical address 554 is translated (as described below with regard to FIG. 6) through the GTLB/EPTs 555 to form the host-physical address 556 of the guest's PD entry. The processor accesses the PD entry using this host-physical address 556.

Information from the PDE includes the base address 562 of the guest's page table (PT) 570 in guest-physical memory. This guest-physical address 562 is combined with bits 20:12 of the guest virtual address 510 appropriately adjusted to form the guest-physical address 564 of the PT entry (PTE) in the guest's page table 570. This guest-physical address 564 is translated (as described below with regard to FIG. 6) through the GTLB/EPTs 565 to form the host-physical address 566 of the guest's PT entry. The processor accesses the PT entry using this host-physical address 566.

Information from the PTE includes the base address 572 in guest-physical memory of the page being accessed. This guest-physical address 572 is combined with the low-order bits (11:0) of the guest virtual address 510 to form the guest-physical address 574 of the memory location being accessed. This guest-physical address 574 is translated (as described below with regard to FIG. 6) through the GTLB/EPTs 575 to form the host-physical address 576 of the memory location being accessed.

Each time the GTLB/EPTs are used to translate a guest-physical address to a host-physical address, the processor also validates that the access is permitted according to controls in the GTLB/EPTs, as will be described below. Additionally, it must be understood that the GTLB/EPTs 535, 545, 555, 565, and 575, though indicated as distinct in FIG. 5, may, in embodiments, be the same GTLB and/or set of EPTs (i.e., a single GTLB and/or set of EPT tables may be used for all address translations from guest-physical to host-physical).

Figure 6:
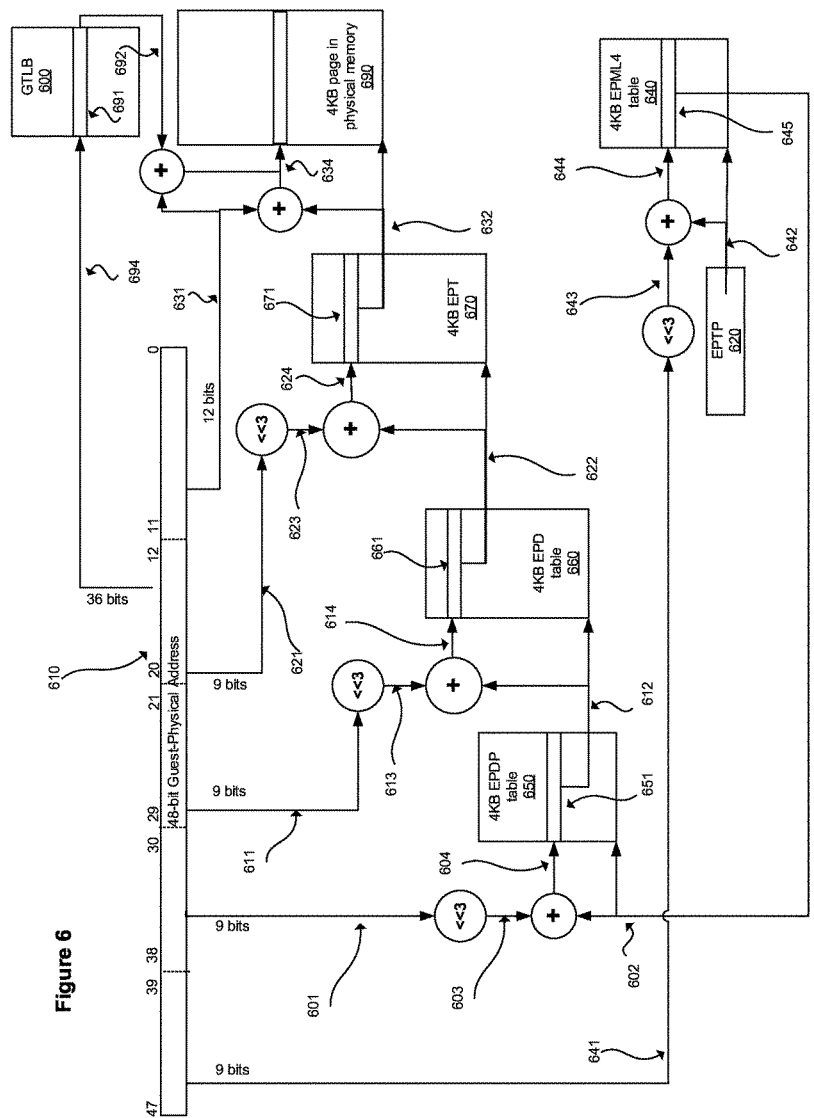
FIG. 6 depicts address computation using a guest physical address translation lookaside buffer and/or hierarchical extended paging tables in one embodiment.

FIG. 6:

FIG. 6 depicts an example of processing using a GTLB and/or EPTs to translate a guest-physical address (GPA) to a host-physical address (HPA), as referred to above with regard to the description of FIG. 5. Prior to performing a page walk of the EPTs, as described below, GTLB 600 may be accessed to determine whether an entry corresponding to the GPA to be translated is present in GTLB 600. For example, bits 47:12 (694) from GPA 610 may be used as an index into GTLB 600 to find entry 691, if present. Information from the GTLB entry 691, if present, includes the base address 692 of the page being accessed in host-physical memory 690. This base address value 692 is combined with (e.g., added to) the low-order bits 11:0 (631) of the GPA 610 to form the HPA 634 of the memory location being accessed.

In embodiments, a GTLB entry (e.g., entry 691) may also include information associated with the corresponding GPA to HPA translation and/or the corresponding HPA, such as EPT memory type and/or access permissions. In embodiments, the information may be cumulative, i.e., include or be derived from corresponding information from each entry found in each page table at each level of a corresponding page walk (e.g., in response to which the GTLB entry may have been created, as described below).

In other embodiments, bits M-1:12 from a GPA may be used as an index into a GTLB to find a GTLB entry, if present, where M represents the maximum physical address width supported by the processor (MAXPHYSADDR). Information from the GTLB entry, if present, includes the base address (e.g., bits M-1:12) of the page being accessed in host-physical memory.

Figure 7:
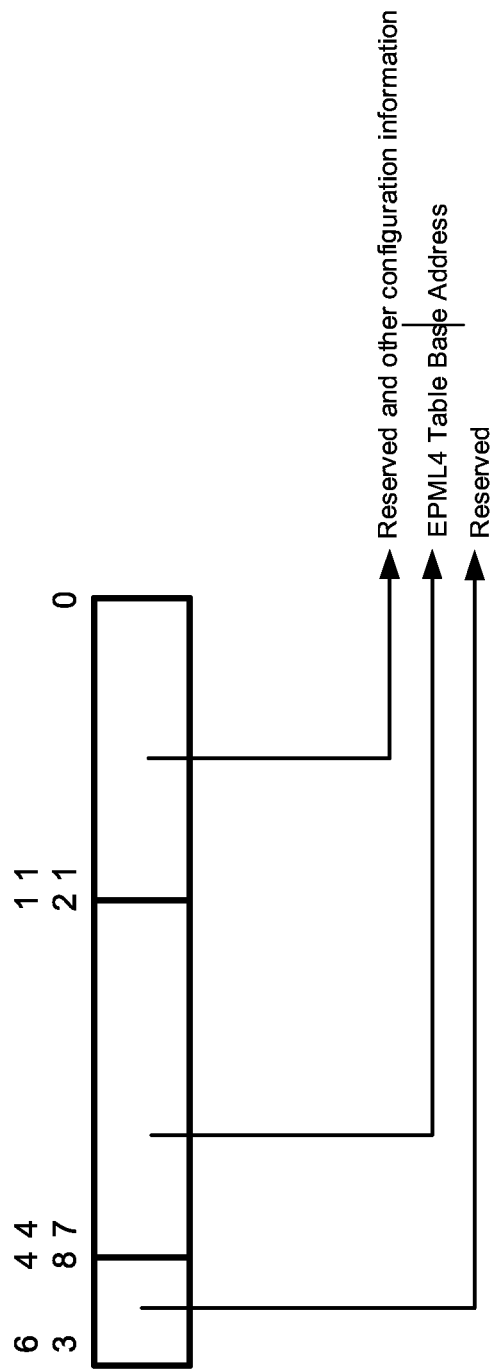
FIG. 7 depicts an extended paging table base address pointer in one embodiment.

In the event that an entry corresponding to the GPA is not found in the GTLB, the translation may be performed using a page walk of the EPTs. In the embodiment shown in FIG. 6, the appropriate bits 642 in an EPT base pointer (EPTP) 620 indicate the host-physical address of the base of the extended PML4 (EPML4) table 640, which is stored in host-physical memory. The EPTP will be discussed in more detail below with regard to FIG. 7. In this example, the entries in the EPTs are 8 bytes each. Bits 47:29 (641) from the guest-physical address 610 are appropriately adjusted by multiplying by 8 (for example, by shifting the value left by 3 bits) to obtain an adjusted upper guest-physical address 643. The EPML4 table base address value 642 is combined with (e.g., added to) the adjusted upper guest-physical address bits 643, forming the host-physical address 644 of an EPML4 table entry 645 in the EPML4 table 640. An example of a format of an entry such as 645 in the EPML4 table 640 (as well as entries in the other EPT tables 640, 660, and 670) will be discussed below with regard to FIG. 8.

Part of the EPML4 table entry 645 is the base address 602 of the extended PDP (EPDP) table 650. A second adjusted address component 603 is formed from bits 38:30 (601) of the guest-physical address 610. This adjusted value 603 is combined with (e.g., added to) the EPDP base address 602 to form the host-physical address 604 of an EPDP table entry 651 in the EDPD table 650. The processor accesses the EPDP table entry 651 using this host-physical address 604.

Part of the EPDP table entry 651 is the base address 612 of the extended PD (EPD) table 660. A third adjusted address component 613 is formed from bits 29:21 (611) of the guest-physical address 610. This adjusted value 613 is combined with (e.g., added to) the EPD base address 612 to form the host-physical address 614 of an EPD table entry 661 in the EPD table 660. The processor accesses the EPD table entry 661 using this host-physical address 614.

Information from the EPD table entry 661 includes the base address 622 of the final extended page table 670. A fourth adjusted address component 623 is formed from bits 20:12 (621) of the guest-physical address 610. This adjusted value 623 is combined with (e.g., added to) the EPT base address 622 to form the host-physical address 624 of an EPT entry 671 in the EPT 670. The processor accesses the EPT entry 671 using this host-physical address 624.

Information from the EPT entry 671 includes the base address 632 of the page being accessed in host-physical memory 690. This base address value 632 is combined with (e.g., added to) the low-order bits 11:0 (631) of the guest-physical address 610 to form the host-physical address 634 of the memory location being accessed.

In an embodiment, in response to the page walk, an entry (e.g., 691) may be created (e.g., by PMH 342) in a GTLB (e.g., GTLB 600), including a portion of a GPA (e.g., bits 47:12 (694) from GPA 610) and a corresponding portion of an HPA (e.g., base address value 632), such that a subsequent translation involving that GPA may use the GTLB instead of a page walk to find the corresponding HPA and associated information, such as EPT memory type and/or access permissions. In an embodiment, a new entry may replace an existing entry, for example, according to a least-recently-used replacement policy. An existing entry may be replaced when the GTLB is full or at any other time.

In the embodiment shown in FIG. 6, the EPT tables are hierarchical. They are similar in form to traditional multi-level page tables. Furthermore, in this example, each EPT table entry in each EPT table is 8 bytes in size, though in other embodiments this size may be different, changing the mechanics of accessing the tables as would be appreciated by one in the art. In this example, each EPT table is 4 KB in size. In other embodiments, different table sizes may be used; moreover, it is not required that all tables in a hierarchy like that depicted in FIG. 6 should be of the same size. This change in size may impact the number of bits used from the guest-physical address to index the next level of the EPT table. It will be obvious to one in the art that many other EPT table configurations are possible.

The hierarchical configuration depicted in the figure shows four levels of hierarchy, with three of the EPT tables 640, 650, and 660 serving as indices to lower level EPT tables 650, 660, and 670 respectively. In other embodiments, there may be fewer (e.g., three or two) levels or more (e.g., five or more) levels of hierarchy in such a hierarchical table. In general, the number of levels of hierarchy may vary depending at least in part on one or more of the number of bits in the guest-physical address, the size of each table, and the number of bytes in each table entry. The guest-physical address in the example in FIG. 6 is forty-eight bits in size. In other embodiments, the guest-physical address may be a different size; this change in size may require a change in the number of levels of EPT table that are required to perform a translation.

FIG. 7:

In embodiments, the EPT controls include the EPT pointer (EPTP). As shown in an embodiment depicted in FIG. 7, the EPTP includes bits used to form the base address (in host-physical memory) of the base of the EPML4 table such as that described above in FIG. 6. In the example depicted in FIG. 7, bits 47:12 form the base address. Bits 11:0 and 63:48 are used for other purposes (e.g., EPT paging structure memory type, EPT page walk length, EPT accessed and dirty flags enable) or reserved. Of course, the widths of the various bit fields may vary in other embodiments, for example, the base address field will change depending on the number of address bits in a particular architecture or implementation. In embodiments, bits M-1:12 may form the base address of the EPML4 table, where M represents the maximum physical address width supported by the processor (MAXPHYSADDR), which in one embodiment may be no greater than 52. The remaining bits in the EPTP register may be used for other purposes in other embodiments. In one embodiment, the EPTP register is accessible only through a virtual machine entry or virtual machine exit. In such an embodiment, the EPTP register in the processor is loaded from an EPTP field in the VMCS at the time of a virtual machine entry, activating the EPT mechanism while the guest software operates. As indicated above, this activation (and loading of the EPTP field) may be controlled by other control bits within the VMCS or elsewhere.

Figure 8:
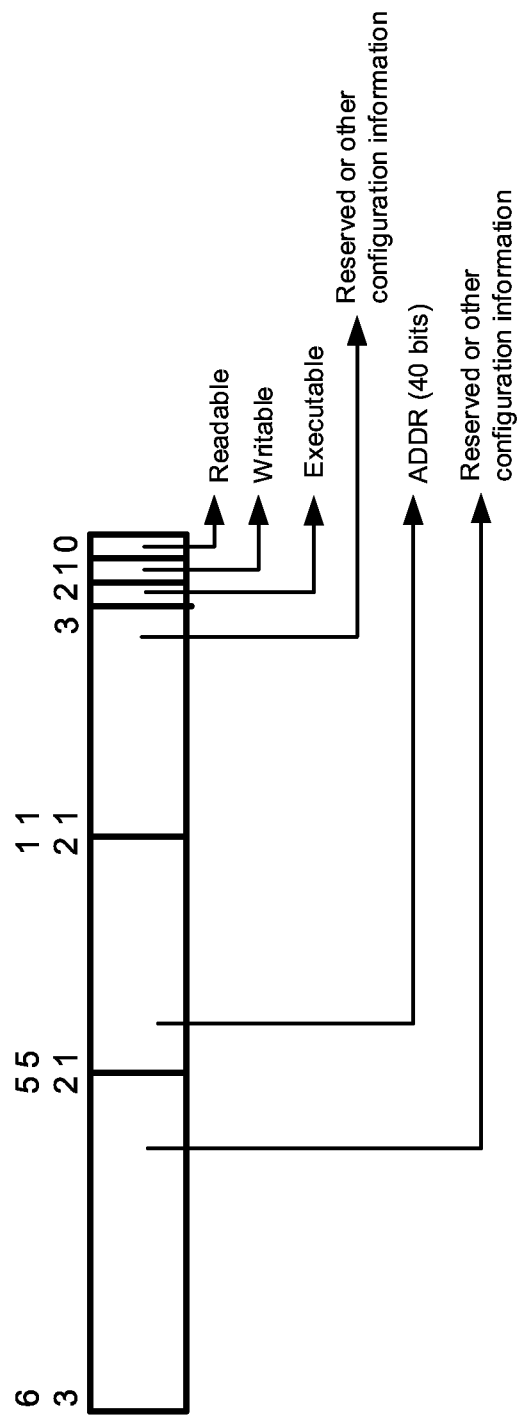
FIG. 8 depicts an extended paging table entry in one embodiment.

FIG. 8:

This figure depicts an example of the format of an entry in an EPT in an embodiment. In this example, each entry in an EPT is 8 bytes in size. In one embodiment, each EPT is 4 KB in size, meaning that there are 512 EPT entries per EPT page. As shown in the example in FIG. 8, each EPT entry contains the base host-physical address of the next level EPT or page in memory (ADDR) and permission and other configuration information. As before, the widths of the various bit fields may vary in other embodiments, for example the ADDR width may change depending on the number of address bits in a particular architecture or implementation. FIG. 8 depicts only three permission bits, readable, writeable, and executable (i.e., if the contents of the page may be fetched and interpreted as instructions by the processor). In other embodiments, other permission and configuration information may be present in each EPT entry.

The EPTs may be in a variety of different formats. For example, they may be implemented as shown in FIG. 6 as simple, hierarchical tables. Alternatively, they may be single level page tables (where the size of the first level EPT dictates the maximum size of the guest-physical address space). Alternatively, they may be hashed tables in some form. It will be obvious to one skilled in the art that a myriad of possible configurations are possible in other embodiments.

The EPTs may support one or more sizes of pages in host-physical memory. In one embodiment, each entry in each EPT includes a super page bit which indicates that the walk of the EPTs should stop at that point and the host-physical address formed using the address information in the EPT entry and the remaining bits in the guest-physical address. In the example shown in FIG. 6, for example, if a super page bit was set in the EPD table 660, the resulting page in host-physical memory would be 2 MB in size and the resulting host-physical address would be formed by combining bits 20:0 of the guest-physical address 610 with the address bits from the EPT table 660.

In some embodiments, the extended paging tables and EPT address translation mechanism may be enabled by virtual machine entry and disabled by virtual machine exit. Thus, as a consequence, the EPT mechanism may not be available for use by either guest software or VMM software to manage its own address translation. Furthermore, in such embodiments, the EPT mechanism may be distinct from and independent of other conventional memory page management mechanisms available to guest or host software, such as for example the IA paging tables in an IA embodiment, though EPT operations may utilize features of the conventional page management mechanism. Thus, the organization and operation of the EPT tables may be completely distinct from other page translation facilities provided by the processor for conventional execution of programs and operations directly on the host machine, as opposed to the execution of guest software that utilizes the virtualization and EPT mechanisms of the host machine. In one embodiment, the EPT mechanism may utilize tables in the same format as that used by a conventional page management mechanism of the embodiment, available to guest and VMM software. However, the tables controlling the EPT mechanism may still be distinct from those controlling either guest-virtual address to guest-physical address translation and from those controlling host-virtual address to host-physical address translation.

Although the examples provided may describe providing support for physical memory virtualization in a virtual machine system in the context of execution units and logic circuits, other embodiments may be accomplished by way of software. Some embodiments may be provided as a software program product or software which may include a machine or machine-readable medium having stored thereon instructions which when accessed by the machine perform a process of the embodiment. In other embodiments, processes might be performed by specific hardware components that contain hardwired logic for performing the processes, or by any combination of programmed components and custom hardware components.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical, or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like may refer to the action and processes of a processor-based system or similar electronic computing device that manipulates and transforms data, represented as physical quantities within the processor-based system's storage or other such information storage, transmission, or display devices, into other data similarly represented.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider making copies of an article (a carrier wave) may constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, optical disks, DVD-ROM disks, DVD-RAM disks, DVD-RW disks, DVD+RW disks, CD-R disks, CD-RW disks, CD-ROM disks, magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps may be added to or deleted from any of the methods, and information may be added or subtracted from any of the described messages without departing from the basic scope of the claimed subject matter. It will be apparent to those skilled in the art that many further modifications and adaptations may be made. The particular embodiments are not provided to limit the claimed subject matter but to illustrate it. The scope of the claimed subject matter is not to be determined by the specific examples provided above but only by the claims below.

What is claimed is:

1. A processor comprising:
an instruction decoder to receive an instruction to transfer control of the processor to guest software to execute on a virtual machine, the virtual machine to have a plurality of resources to be controlled by a virtual machine monitor to execute on a host machine having a host-physical memory to be accessed using a plurality of host-physical addresses, the plurality of resources to include a guest-physical memory, the guest software to access the guest-physical memory using a plurality of guest-virtual addresses;
a control register to store a pointer to a plurality of virtual address page tables;
memory address translation hardware to translate, without causing a virtual machine exit, guest-virtual addresses to host-physical addresses using the plurality of virtual address page tables to translate guest-virtual addresses to guest-physical addresses and a plurality of extended page tables to translate guest-physical addresses to host-physical addresses, the memory address translation hardware including
first circuitry to combine a first portion of a guest-virtual address with the pointer to the plurality of virtual address page tables to calculate a first guest-physical address,
second circuitry to combine a first portion of the first guest-physical address with one of a plurality of extended page table pointers to calculate a first host-physical address of a first entry in a first extended page table in a first level of hierarchy,
a virtual address translation lookaside buffer in which to store a plurality of virtual address entries corresponding to guest-virtual address to host-physical address translations, and
a guest-physical address translation lookaside buffer in which to store a plurality of guest-physical address entries corresponding to guest-physical address to host-physical address translations, each of the plurality of guest-physical address entries including a field in which to store one of the plurality of extended page table pointers to indicate whether the entry is valid for an active set of extended page tables.

2. The processor of claim 1, wherein the plurality of virtual address page tables includes four levels of hierarchy.

3. The processor of claim 2, wherein the plurality of extended page tables includes four levels of hierarchy.

4. The processor of claim 3, wherein the memory address translation hardware also includes third circuitry to combine a second portion of the first guest-physical address with a first base address from the first entry to calculate a second host-physical address of a second entry in a second extended page table in a second level of hierarchy.

5. The processor of claim 4, wherein the memory address translation hardware also includes fourth circuitry to combine a third portion of the first guest-physical address with a second base address from the second entry to calculate a third host-physical address of a third entry in a third extended page table in a third level of hierarchy.

6. The processor of claim 5, wherein the memory address translation hardware also includes fifth circuitry to combine a fourth portion of the first guest-physical address with a third base address from the third entry to calculate a fourth host-physical address of a fourth entry in a fourth extended page table in a fourth level of hierarchy.

7. The processor of claim 6, wherein the memory address translation hardware also includes sixth circuitry to combine a fifth portion of the first guest-physical address with a fourth base address from the fourth entry to calculate a fifth host-physical address.

8. The processor of claim 7, wherein the fourth base address is a base address of a page in host-physical memory.

9. The processor of claim 8, wherein, in response to a page walk from the first guest-physical address to the base address of the page in host-physical memory, a guest-physical address entry is stored in the guest-physical address translation lookaside buffer.

10. The processor of claim 9, wherein the guest-physical address entry in the guest-physical address translation lookaside buffer is to include the first portion of the first guest-physical address, the second portion of the guest-physical address, the third portion of the guest-physical address, and the fourth portion of the guest-physical address in a guest-physical address index to the guest-physical address translation lookaside buffer.

11. The processor of claim 10, wherein the guest-physical address entry in the guest-physical address translation lookaside buffer is also to include the base address of the page in host-physical memory.

12. The processor of claim 11, wherein the guest-physical address entry in the guest-physical address translation lookaside buffer is also to include cumulative access permission information associated with the base address of the page in host-physical memory.

13. The processor of claim 12, wherein the cumulative access permission information is based on a first access permission from the first extended page table, a second access permission from the second extended page table, a third access permission from the third extended page table, and a fourth access permission from the fourth extended page table.

14. The processor of claim 13, wherein the memory address translation hardware is to use the guest-physical address entry, instead of the plurality of extended page tables, to translate the guest-physical address index to the base address of the page in host-physical memory.

15. A method comprising:
transferring control of a processor to guest software to execute on a virtual machine, the virtual machine to have a plurality of resources to be controlled by a virtual machine monitor executing on a host machine having a host-physical memory to be accessed using a plurality of host-physical addresses, the plurality of resources to include a guest-physical memory, the guest software to access the guest-physical memory using a plurality of guest-virtual addresses;
performing, by processor hardware without exiting the virtual machine, an initial translation of a guest-virtual address to a host-physical address, including a page walk through a plurality of virtual address page tables and a plurality of extended page tables;
storing, by processor hardware in response to the page walk without exiting the virtual machine, an entry in a guest-physical address translation lookaside buffer, the entry including a portion of a guest-physical address, a portion of the host-physical address, and one of a plurality of extended page table pointers to indicate whether the entry is valid for an active set of extended page tables; and performing, by processor hardware without exiting the virtual machine, a subsequent translation of the guest-virtual address to the host-physical address, using the entry in the guest-physical address translation lookaside buffer to translate the portion of the guest-physical address to the portion of the host-physical address instead of performing a portion of the page walk.

16. A system comprising:

a host-physical memory to be accessed using a plurality of host-physical addresses; and a processor including:

an instruction decoder to receive an instruction to transfer control of the processor to guest software to execute on a virtual machine, the virtual machine to have a plurality of resources to be controlled by a virtual machine monitor, the plurality of resources to include a guest-physical memory, the guest software to access the guest-physical memory using a plurality of guest-virtual addresses;

a control register to store a pointer to a plurality of virtual address page tables;

memory address translation hardware to translate, without causing a virtual machine exit, guest-virtual addresses to host-physical addresses using the plurality of virtual address page tables to translate guest-virtual addresses to guest-physical addresses and a plurality of extended page tables to translate guest-physical addresses to host-physical addresses, the memory address translation hardware including first circuitry to combine a first portion of a guest-virtual address with the pointer to the plurality of virtual address page tables to calculate a first guest-physical address, second circuitry to combine a first portion of the first guest-physical address with one of a plurality of extended page table pointers to calculate a first host-physical address of a first entry in a first extended page table in a first level of hierarchy, a virtual address translation lookaside buffer in which to store a plurality of virtual address entries corresponding to guest-virtual address to host-physical address translations, and a guest-physical address translation lookaside buffer in which to store a plurality of guest-physical address entries corresponding to guest-physical address to host-physical address translations, each of the plurality of guest-physical address entries including a field in which to store one of the plurality of extended page table pointers to indicate whether the entry is valid for an active set of extended page tables.

* * * * *